United States Patent [19]

Sobue

[11] Patent Number: 4,570,483
[45] Date of Patent: Feb. 18, 1986

[54] PIEZO-ELECTRIC LEVEL SENSOR FOR INTERNAL COMBUSTION ENGINE

[75] Inventor: Hideo Sobue, Aichi, Japan

[73] Assignee: NGK Spark Plug Co., Ltd., Aichi, Japan

[21] Appl. No.: 634,366

[22] Filed: Jul. 25, 1984

[30] Foreign Application Priority Data

Jul. 26, 1983 [JP] Japan .................. 58-115877[U]
Aug. 5, 1983 [JP] Japan .................. 58-122421[U]

[51] Int. Cl.⁴ .................................. G01M 15/00
[52] U.S. Cl. .................................. 73/290 V; 73/118
[58] Field of Search ............... 73/290 V, 118, 295; 123/198 D; 310/321, 336, 351; 340/59

[56] References Cited

FOREIGN PATENT DOCUMENTS 26226 2/1983 Japan .................. 73/290 V
208626 12/1983 Japan .................. 73/295

Primary Examiner—Jerry W. Myracle
Attorney, Agent, or Firm—Finnegan, Henderson, Farabow, Garrett & Dunner

[57] ABSTRACT

A sensor for detecting the level of oil in the crankcase of an internal combustion engine. The sensor has a generally tubular body and at one end a thin metal plate to which is bonded the piezo-electric element. The plate, and hence the piezo-electric element, are oriented in the crankcase such that they are generally perpendicular to the level of the oil within the crankcase.

5 Claims, 11 Drawing Figures

PIEZO-ELECTRIC LEVEL SENSOR FOR INTERNAL COMBUSTION ENGINE

BACKGROUND OF THE INVENTION

The present invention relates to piezo-electric level sensors that detect the level of oil in the crankcase of an internal combustion engine.

A conventional piezo-electric sensor that detects the presence of oil by means of a transducer mounted in a tubular member oriented in the manner depicted in FIGS. 2 and 4A is not reliable because oil may cling to the horizontal surface to which the sensing element is bonded. Even when such a sensor is mounted obliquely as shown in FIGS. 2A and 8A, oil may adhere to the exterior of the surface on which the sensing element is bonded and give erroneous indications of the oil level.

Where the remote sensing of oil level in a crankcase can activate an alarm or even shut down the engine, the reliability of the sensor should be high. In addition, if the sensor detects oil on the end of the sensor but the oil level is actually below the end of the sensor, serious engine damage can occur without a warning from the sensor.

Therefore, it is the principle object of the present invention to provide a sensor that detects the level of engine oil for an internal combustion engine that is not susceptible to false readings caused by oil adherent to the end of the sensor.

A further object of the invention is to provide a sensor that is oriented to drain oil that is splashed upon it by operation of the engine.

These and other objects of the invention can be accomplished by practice of the invention as herein disclosed.

SUMMARY OF THE INVENTION

To accomplish these and other objects of the invention, the present invention comprises a sensor assembly for detecting the level of oil in the crankcase of an internal combustion engine. The assembly includes a level sensor having a generally tubular body and an end closure. The end closure is comprised of a thin metal plate affixed to one end of the tubular body. The outer surface of the plate is disposed to contact the oil to be detected while the inner surface of the plate has a piezo-electric element bonded to it. The piezo-electric element is electrically connected to a sensor that monitors output from the element to determine if the end of the level sensor is in contact with the oil. The level sensor is affixed through a crankcase wall such that the outer surface of the plate on the end of the level sensor is generally perpendicular to the surface of the oil in the crankcase.

Preferably, the tubular body of the level sensor is parallel to the surface of the oil with said outer surface of the end closure perpendicular thereto.

The present invention will now be disclosed in terms of its preferred embodiments.

DESCRIPTION OF THE PREFERRED EMBODIMENTS

Figure 1:
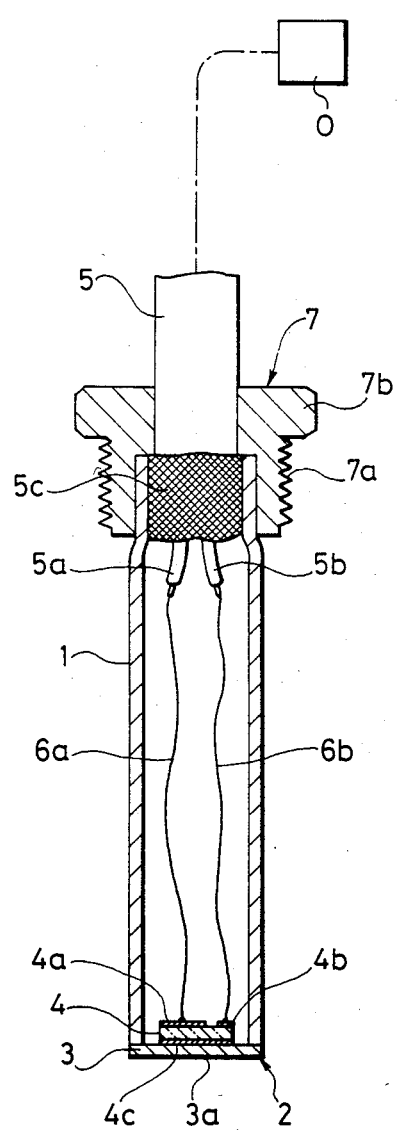
FIG. 1 is a vertical cross section of a conventional piezo-electric sensor used in connection with the present invention.

FIG. 1 shows a typical example of a piezo-electric level sensor having a tubular body 1 of corrosion-resisting metal such as stainless steel. At one extremity the device includes a sensing element 2 comprised of a thin plate 3 of corrosion-resisting metal and a piezo-electric element 4 bonded to the center of the inner surface of the thin plate 3. The sensing element 2 is secured in the tubular body 1 by a liquid-tight joint at the periphery of the thin metal plate 3 at the lower end face of the tubular body 1. The piezo-electric element 4 is of the feedback oscillation type that drives an electrode 4a having a relatively large area and a relatively small feedback electrode 4b. The electrodes 4a and 4b are placed on the front surface of a piezo-electric disc of lead titanate-zirconate or the like while a common electrode 4c covers the entire rear surface of the disc. The invention, however, is not limited to this construction.

Further in FIG. 1, the device includes an output cable which has a pair of conductors 5a and 5b and a metal braid 5c. The conductors 5a and 5b are connected through lead wires 6a and 6b to the drive electrode 4a and the feedback electrode 4b of the piezo-electric element 4. The metal braid 5c covers the conductors 5a and 5b for the purpose of shielding it from radio waves and is connected through the tubular body 1 to the common electrode 4c of the piezo-electric element 4. The metal braid 5c is grounded when the piezo-electric level sensor is installed on the engine. At one end of the cable 5, the braid 5c is partially exposed. The part thus exposed fits into the tubular body 1 from above, and is then fixedly secured therein by tightening the tubular body from outside. The other end of the cable 5 is extended and connected to an output system 0 so that the piezo-electric element gives positive feedback drive to an oscillation and amplification circuit in the output control system. The output system then provides information as to the oil level in response to the condition detected by the level sensor.

Figure 2:
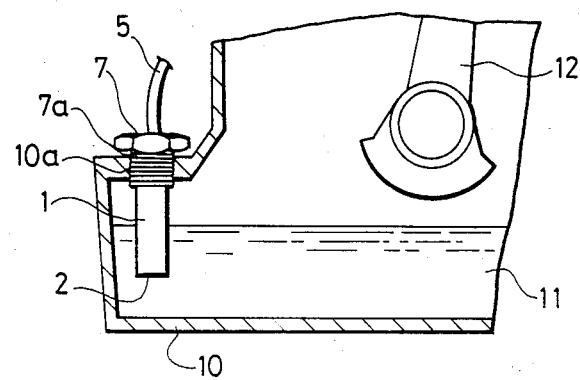
FIG. 2 is a schematic partial cross section showing a conventional manner of mounting such a sensor.

In one embodiment the level sensor may be installed on a four-cycle internal combustion engine as described below. As depicted in FIG. 1, a mounting member 7 is affixed on the upper end portion of the tubular body 1. The mounting member 7 is a hollow structure comprised of a threaded part 7a having threads cut on the outer wall thereof and a hexagonal head 7b. As shown in FIG. 2, the sensing element 2 at the lower end of the sensor protrudes into a crankcase 10, which contains oil 11 to be detected, through a threaded hole 10a which is vertically or obliquely cut in the outer wall of the crankcase 10. The threaded portion 7a of the mounting member 7 is engaged with the threaded hole 10a so that the sensing element 2 is held at a predetermined level.

The sensing element 2 is maintained in a state of oscillation by an oscillating signal from the sensor system 0 at all times. However, when the level of the oil is higher than a predetermined value, i.e., the sensing element 2 of the sensor is covered by the oil, the sensing element will not oscillate because of its contact resistance with the oil. If, during operation of the engine, the level of the oil becomes lower than a predetermined value, i.e., the sensing element 2 is exposed to the air, the sensing element 2 oscillates to operate the sensor system 0, so that an alarm such as a lamp or a buzzer is operated or the engine is stopped immediately to prevent engine damage or seizure due to an oil shortage.

Figure 2A:
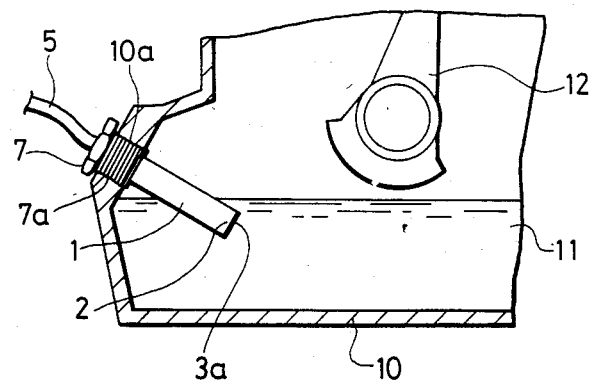
FIG. 2A is a schematic partial cross section showing another manner of orienting the sensor.
Figure 4A:
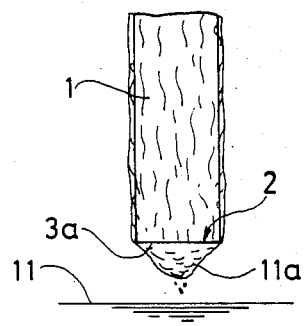
FIG. 4A illustrates how oil may drain from the surface of a sensor oriented in the manner of FIG. 2 such that a spurious indication of oil at the end of the sensor may be given.

The piezo-electric level sensor may be mounted vertically (FIG. 2) or obliquely (FIG. 2A), and accordingly, the sensing surface 3a (or the outer surface of the thin metal plate 3) of the sensing element 3 at the lower end of the tubular body 1 is held horizontally or obliquely. Therefore, when the level of the oil becomes lower than the predetermined value, the sensing element 2 should be exposed to the air. However, as shown in FIG. 4A where the tubular body is vertical, drops of oil, which are splashed by rotation of the crankshaft 12, stick to the outer surface of the tubular body 1 and flow down the outer surface. The oil drops 11a form a semispherical pool on the sensing surface 3a of the sensing element 2 by surface tension. The oil then drops into the remaining oil in the crankcase. Therefore, the pooled oil acts as load to the sensing element, thus obstructing its oscillation and causing an erroneous output. For such a reason, conventional sensors have low reliability.

Figure 3:
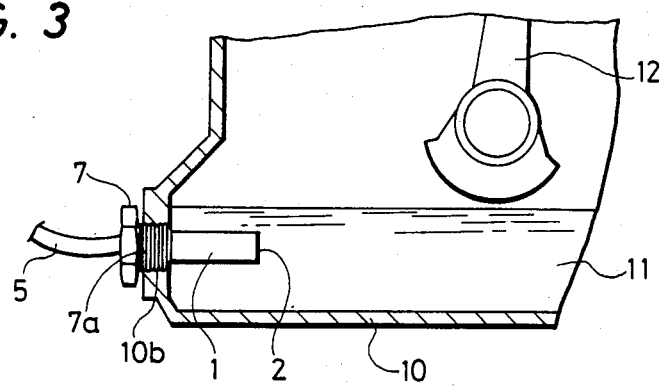
FIG. 3 is a schematic partial cross section showing the sensor mounted in accordance with one embodiment of the present invention.

In the embodiment of FIG. 3, a threaded opening 10b, engages the threaded part 7a of the mounting member 7. The mounting member 7 fits over the upper end portion of the piezo-electric level sensor shown in FIG. 1, and is placed in the crankcase 10 extending horizontally. Therefore, when the piezo-electric sensor is placed within the threaded opening 10b, it is held horizontally. In such a configuration, the sensing element 2 at the lower end of the tubular body 1 is held substantially vertical.

Figure 4B:
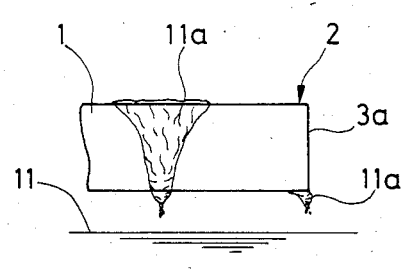
FIG. 4B illustrates how oil may adhere to the surface of a detector oriented in the manner of FIG. 3 without adhering to the end surface.

Because the piezo-electric sensor is mounted horizontally, the outer wall of the tubular body 1 is held substantially horizontal and the sensing surface 3a of the sensing element 2 is substantially vertical. Therefore, as shown in FIG. 4B, the oil 11a splashed onto the outer wall of the tubular body by the crankshaft 12 flows down the outer wall. Oil drops flying horizontally may stick to the sensing surface 3a, however, such drops will fall immediately. Accordingly, the sensor mounted according to this embodiment of the invention, unlike the sensor mounted according to the conventional method, will not have the problem of oil drops flowing down the sensing element pooling onto the sensing surface 3a. Therefore, when the level of the oil becomes lower than a predetermined amount, i.e., the sensing element 2 is exposed to the air, the sensor oscillates immediately to provide a stable, positive indication of the oil level.

Figure 5:
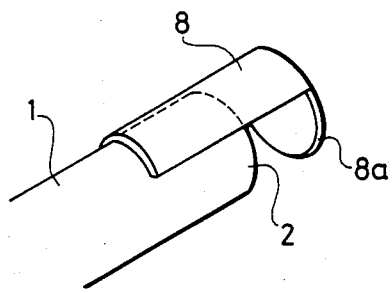
FIG. 5 is a perspective view of another embodiment of the invention.

In another preferred embodiment as shown in FIG. 5, an L-shaped protective member 8 having a cover plate 8a may be coupled to the lower end portion of the tubular body 1 of the piezo-electric level sensor. The protective member covers the sensing element 2 from above. In this embodiment, oil drops flying sideways are blocked by the protective member 8 and will not stick to the sensing element 2. Thus, the oil detecting operation is carried out more reliably.

Figure 6:
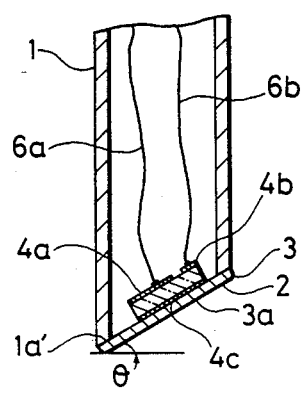
FIG. 6 is a cross-sectional view of an embodiment of the invention where the end surface of the sensor and hence the piezo-electric element, are at an angle to the tubular body.
Figure 7:
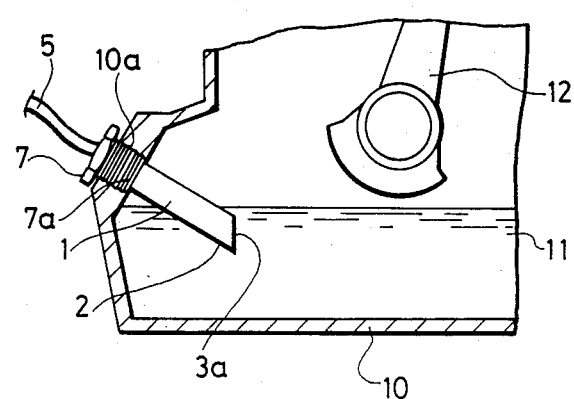
FIG. 7 is a schematic partial cross section showing the sensor mounted in the crankcase in accordance with an embodiment of the invention.

Another embodiment of the invention is shown in FIG. 6 where the lower end portion 1a of the tubular body 1 is cut obliquely, at a predetermined angle $\theta$, to form an end face 1a. The periphery of the thin metal plate 3 (the inner surface of which has the piezo-electric element 4 bonded thereto) is joined liquid-tight to the end face 1a' so that the sensing element 2 is inclined. The angle $\theta$ of inclination is determined such that, when the piezo-electric level sensor is affixed within the mounting hole 10a of the crankcase 10, the sensing surface 3a of the sensing element 2 is verticle, as shown in FIG. 7.

Figure 8A:
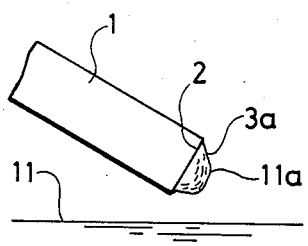
FIG. 8A illustrates how oil may adhere to the surface of a detector oriented in the manner of FIG. 2A such that a spurious indication of oil at the end surface of the sensor may be given.
Figure 8B:
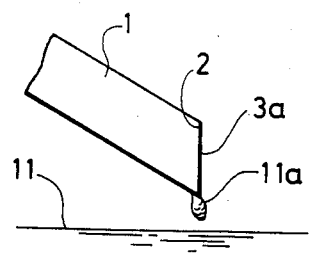
FIG. 8B illustrates how oil may adhere to the surface of a detector oriented in the manner of FIG. 7 without adhering to the end surface of the sensor.

As was described above, in the piezo-electric level sensor of this embodiment, the lower end portion of the tubular body is cut obliquely, at a predetermined angle $\theta$ with respect to the tubular body to form the end face 1a'. The sending element 2 is arranged on the end face 1a' thus formed. Therefore, when the piezo-electric level sensor is affixed within the mounting hole 10a of the crankcase 10 containing the oil 11 to be detected, the sensing surface 3a of the sensing element is vertical. Accordingly, even if oil drops 11a splashed by the crankshaft 12 flow down the outer wall of the tubular body, they will drop onto the periphery of the sensing surface 3a of the sensing element 2 instantly, as shown in FIG. 8b. Thus, according to this embodiment of the invention, the difficulty that oil is retained on the sensing surface 3a of the sensing element 2 for a long period, as shown in FIG. 8A, will not occur. Accordingly, when the level of the oil becomes lower than a predetermined value, i.e., the sensing element 2 is exposed to the air, the latter oscillates immediately to permit the stable, positive detection of that condition. Thus, the invention has a significant merit since piezo-electric level sensors that are highly reliable can be provided.

The present invention has been disclosed in terms of preferred embodiments but the invention is not limited thereto. The scope of the invention is determined by the appended claims and their equivalents.

What is claimed is:

1. A sensor assembly for detecting the level of oil in the crankcase of an internal combustion engine, said assembly comprising:
    (a) a level sensor having a generally tubular body and an end closure comprised of a thin metal plate affixed to one end of said tubular body, the outer surface of said plate being disposed to contact the oil to be detected, the inner surface of said plate having a piezo-electric element bonded thereto;
    (b) means for electrically connecting output means to said piezo-electric element; and
    (c) means for affixing said level sensor through a wall of said crankcase such that said outer surface of said plate is generally perpendicular to the surface of the oil in said crankcase.

2. The assembly of claim 1 wherein said plate and said piezo-electric element are at an oblique angle to said tubular body.

3. The assembly of claim 1 wherein said plate and said piezo-electric element are perpendicular to said tubular body and said tubular body is affixed in said crankcase such that said tubular body is generally parallel with the surface of said oil.

4. The assembly of claim 1 wherein said level sensor includes a baffle affixed to said tubular body, said baffle being disposed to shield said outer surface from oil spray when said outer surface is above the surface of oil in said crankcase.

5. The assembly of claim 4 wherein said baffle comprises a sheet metal member affixed to said tubular body, said member having a baffle portion generally parallel to and disposed from said outer surface.

* * * * *